United States Patent

Walz et al.

[11] Patent Number: 4,988,463
[45] Date of Patent: Jan. 29, 1991

[54] FOAM SUPPRESSANTS

[75] Inventors: Klaus Walz, Leverkusen; Karl-Heinz Breyer, Kuerten-Biesfeld, both of Fed. Rep. of Germany

[73] Assignee: Bayer Aktiengesellschaft, Leverkusen, Fed. Rep. of Germany

[21] Appl. No.: 322,441

[22] Filed: Mar. 13, 1989

[30] Foreign Application Priority Data

Mar. 26, 1988 [DE] Fed. Rep. of Germany ....... 3810426

[51] Int. Cl.$^5$ ....................... B01D 17/00; B01D 19/04
[52] U.S. Cl. ...................................... 252/358; 252/321
[58] Field of Search ................................ 252/321, 358

[56] References Cited

U.S. PATENT DOCUMENTS

| | | | |
|---|---|---|---|
| 2,715,614 | 8/1955 | Snook | 252/358 |
| 3,652,453 | 3/1972 | MacDonnell | 252/358 |
| 3,990,905 | 11/1976 | Wachala et al. | 252/321 X |
| 4,032,478 | 6/1977 | Berg et al. | 252/358 |
| 4,088,601 | 5/1978 | Shane et al. | 252/358 |
| 4,208,301 | 6/1980 | Gammon | 252/321 |
| 4,225,456 | 9/1980 | Schmidt et al. | 252/321 |
| 4,767,568 | 8/1988 | Abel et al. | 252/321 |
| 4,950,420 | 8/1990 | Svarz | 252/321 |

Primary Examiner—Richard D. Lovering
Assistant Examiner—Daniel S. Metzmaier
Attorney, Agent, or Firm—Sprung Horn Kramer & Woods

[57] ABSTRACT

Agents which contain (a) an ester of aliphatic carboxylic acids and aliphatic alcohols having a boiling point of at least 150° C. and —based on (a –b) 0.5–10% by weight of an amide of the formula

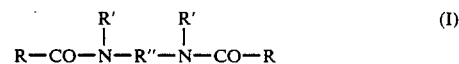

in which
R stands for $C_{10}$–$C_{22}$-alkyl or -alkenyl,
R' stands for H or $C_1$–$C_4$-alkyl, or the two R' together stand for an ethylene bridge, and
R" stands for the radicals

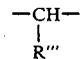

or —$CH_2$—O—$CH_2$—, wherein
R''' stands for H, $C_1$–$C_6$-alkyl or phenyl, and (c) 1–30% by weight of a non-ionic surfactant are used for removing foam, for preventing foam formation and for deaerating aqueous systems.

5 Claims, No Drawings

FOAM SUPPRESSANTS

The invention relates to foam suppressants and deaerating agents which contain (a) an ehter of aliphatic carboxylic acids and aliphatic alcohols having a boiling point of at least 150° C. and—based on a—b) 0.5–10% by weight of an amide of the formula

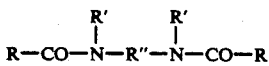  (I)

in which
R stands for $C_{10}$–$C_{22}$–alkyl or -alkenyl,
R' stands for H or $C_1$–$C_4$-alkyl, or the two R' together stand for an ethylene bridge, and
R" stands for the radicals

or $-CH_2-O-CH_2-$,
wherein
R'" stands for H, $C_1$–$C_6$-alkyl or phenyl,
and (c) 1–30% by weight of a non-ionic surfactant, a process for their preparation and their use for removing foam, for preventing foam formation and for deaerating aqueous systems.

Possible esters are above all those having a melting point of less than 50° C.

The total number of carbon atoms in the esters (a) is at least 12 and is preferably 12–70.

Esters of mono- and dicarboxylic acids and 1— to 4-hydric alcohols may be mentioned in particular.

The carboxylic acids can be saturated or unsaturated and substituted by 1 or 2 OH groups. They preferably have 1 to 22 carbon atoms.

Monocarboxylic acids having 1–22, in particular 12–22, C atoms and dicarboxylic acids having 2–8, in particular 4–6, C atoms may be mentioned in particular.

Examples which may be mentioned are: formic acid, acetic acid, octanoic acid, decanoic acid, dodecanoic acid, dodecenoic acid, tetradecanoic acid, hexadecanoic acid, octadecanoic acid, octadecenoic acid, octadecadienoic acid, eicosanoic acid, eicosenoic acid, docosanoic acid, docosenoic acid, succinic acid, maleic acid and adipic acid.

The carbon chain of the alcohols can be saturated or unsaturated and interrupted by 1 or 2 oxygen atoms. The chains have, in particular, 1 to 18 carbon atoms.

Alcohols which may be mentioned in particular are $C_1$–$C_{18}$-alkanols and -alkenols, $C_2$–$C_6$-alkanediols, $C_3$–$C_5$-alkanetriols, $C_4$- or $C_5$-alkanetetrols, diand triethylene glycol, di- and tripropylene glycol, mixed di- and triethylene/propylene glycols and mono-$C_1$–$C_4$-alkyl ethers of the polyhydric alcohols mentioned.

Examples which may be mentioned are: methanol, ethanol, propanol, isopropanol, butanol, sec.-butyl alcohol, tert.-butanol, hexanol, 2-ethylhexanol, octanol, decanol, dodecanol, tridecyl alcohol, ethylene glycol, propylene glycol, butanediol, hexanediol, glycerol, erythritol, pentaerythritol, diethylene glycol, dipropylene glycol, tripropylene glycol and diethylene glycol monomethyl and monobutyl ethers.

Examples of the esters which may be mentioned are: methyl laurate, the methyl ester of coconut fatty acid, the methyl ester of tallow fatty acid, methyl oleate, butyl laurate, hexyl laurate, isopropyl myristate, isopropyl palmitate, isobutyl stearate, tridecyl stearate, decyl oleate, decyl acetate, hexadecyl acetate, didecyl malonate, diisooctyl maleate, didocyl maleate, ditridecyl maleate, dibutyl adipate, diisooctyl adipate, propylene glycol distearate, diethylene glycol dilaurate, glyceryl trilaurate, coconut fat, olive oil, castor oil, soya oil, palm oil, palm kernel oil, tall oil, rape oil, tallow fat, sperm oil, trimethylolpropane tri-decanoate and pentaerythritol tetraisopalmitate.

Examples which may be mentioned of amides of the formula (I) are: methylene-bis-lauric acid amide, methyl-ene-bis-myristic acid amide, methylene-bis-palmitic acid amide, methylene-bis-stearic acid amide, methylene-biseicosanoic acid amide, methylene-bis-behenic acid amide, methylene-bis-oleic acid amide, isobutylene-bis-stearic acid amide, benzylidene-bis-stearic acid amide, methyl-ene-bis-linoleic acid amide, bispalmitoyl-aminoethyl ether, bis-stearoylaminomethyl ether, 1,3-bis-lauroylimidazolidine or 1,3-bis-stearylimidazolidine. Preferred compositions contain methylene-bis-stearic acid amide, methylene-bis-eicosanoic acid amide or methylene-bisbehenic acid amide, but in particular methylene-bisstearic acid amide. The compounds are for the most part known and can be prepared by known processes, such as are described, for example, in DE-OS (German Published Specification) 2,202,831 or in U.S. Pat. specification 2,554,846.

Suitable non-ionic surfactants are reaction products of optionally unsaturated fatty acids, fatty acid amides, fatty acid glycerides, fatty alcohols or fatty amines containing 8 to 20 carbon atoms or $C_6$–$C_{12}$-alkylphenols with ethylene oxide and/or propylene oxide, and derivatives of such compounds, such as are obtained, for example, by esterification of the terminal hydroxyl groups with carboxylic acids, such as acetic acid, lauric acid or benzoic acid, or by etherification with, for example, isobutylene or alkyl chlorides. Other suitable non-ionic surfactants are also surface-active derivatives of polyhydric alcohols, for example fatty acid esters of acids having 10–20 carbon atoms and pentitols, hexitols, pentoses, hexoses or polysaccharides, and oxyethylation products thereof. Preferred non-ionic surfactants are reaction products of fatty acids, fatty acid amides or fatty acid glycerides containing 12–18 carbon atoms with 3–30 mol of ethylene oxide, of fatty alcohols containing 8–18 carbon atoms or of $C_6$–$C_9$-alkylphenols with 3–30 mol of ethylene oxide, or esters of such compounds with fatty acids containing 12–18 carbon atoms.

Preferred antifoam agents contain (a) an ester of fatty acids containing 12–22 carbon atoms with monohydric alcohols containing 1–4 carbon atoms, diesters of these fatty acids with diols containing 2–6 carbon atoms or, in particular, synthetic or naturally occurring triesters of these fatty acids with glycerol. (b) 1–8% by weight—based on a—of an amide of the formula (I), in particular methylene-bis-stearic acid amide, and (c) 4–25% by weight—based on a—of a non-ionic surfactant, in particular of a reaction product of aliphatic alcohols, fatty acids, fatty acid amides or fatty acid glycerides containing 8–18 carbon atoms with 3–30 mol of ethylene oxide.

To prepare the compositions according to the invention, the individual components can be mixed with one another in any desired sequence. For this, the mixture is heated to above the melting point of the amide of the formula (I) and then cooled to temperatures below 50° C. as quickly as possible, with thorough stirring.

In a preferred embodiment, the amide of the formula (I) is dissolved in some of the ester used at 100–150° C. and the hot solution is then introduced slowly into a mixture, kept at 10–80° C., preferably 2050° C., of the remainder of the ester, the emulsifiers and if appropriate other additives. It is also possible for the non-ionic emulsifier to be added in its entirety or in part to the hot solution of the amide in the ester, or to be subsequently stirred only into the cold dispersion of the amide (I) in the ester.

The foam suppressants according to the invention are outstandingly suitable for foam suppression and for preventing foam formation in aqueous systems which tend to foam. They are particularly suitable for use in all the processing stages of the textile industry, for example during desizing or bleaching, during pretreatment, during dyeing, printing or rinsing, and during finishing and high-quality finishing. Other fields of use are, for example, the sugar, paper, leather and lacquer industry.

The agents according to the invention are moreover outstandingly suitable for deaerating aqueous systems. They can be used for removing air bubbles in textile treatment liquors, for example in package dyeing. The air bubbles lead to uneven dyeings.

The particular amounts of agents used in general depend on the content of foaming components in the aqueous systems and on the apparatus circumstances. They can easily be determined by simple preliminary experiments. For textile treatment baths, amounts of 0.01–3 g/l, or 0 1–5 g/kg for printing pastes, have in general proved to be adequate.

Compared with the silicone-containing foam suppressants often used to date, the foam suppressants according to the invention have the advantage that they do not lead to the dreaded silicone spots on the treated textiles which are difficult to remove. This advantage has an effect particularly when using short liquor ratios, for example 1:5 to 1:15, since in these processes emulsions of silicone-containing foam suppressants are broken down by the high mechanical forces which arise in the apparatuses. Another advantage of the foam suppressants according to the invention lies in their greater stability towards the action of frost. Silicone-containing foam suppressant emulsions are unstable under these conditions.

Compared with commercially available silicone-free foam suppressants based on mineral oil or polyether, the foam suppressants according to the invention are distinguished in that they exhibit a better and constant foam suppressant action in the strongly acid, in the neutral and in the alkaline range.

Compared with the compositions described in EP-PS No. 35,702, the foam suppressants according to the invention also have the advantage that products which form stable emulsions in water are also obtained without the quaternary ammonium compounds mentioned therein.

The foam suppressant action of the products according to the invention was tested by the method described in "Bayer Farben Revue" Special Issue 9, Aug. 1967, page 77.

In product comparisons, on exceeding the 15 second limit the test amounts of the antifoam agent are increased until the foam collapses within the specified period of 0–15 seconds.

The parts mentioned in the examples are parts by weight.

EXAMPLE 1

12.3 parts of methylene-bis-stearic acid amide are dissolved in 120 parts of soya oil at 130–140° C. This solution is now run slowly into a mixture, kept at 0°–30° C., consisting of 110 parts of soya oil, 43 parts of a reaction product of industrial lauryl alcohol with 3 mol of ethylene oxide, 12 parts of a reaction product of nonylphenol with 7 mol of ethylene oxide and 7.8 parts of a reaction product of oleyl alcohol with 20 mol of ethylene oxide. The mixture is stirred at 20–30° C. for 30 minutes to give an oily dispersion which can be emulsified in water. (Viscosity at 25° C. 155 mPa.s, characteristic IR bands at 3.02 and 6.45 microns).

EXAMPLE 2

25 parts of methylene-bis-stearic acid amide are dissolved in 180 parts of rape oil at 130° C. This solution is now slowly added dropwise to a mixture, kept at 30° C., consisting of 260 parts of rape oil, 85 parts of a reaction product of industrial lauryl alcohol with 3 mol of ethylene oxide, 18.2 parts of a reaction product of nonylphenol with 6 mol of ethylene oxide, 5.8 parts of a reaction product of nonylphenol with 10 mol of ethylene oxide and 15.4 parts of a reaction product of oleyl alcohol with 20 mol of ethylene oxide. When the addition has ended, the mixture is subsequently stirred for a further ½ hour to then give an oily dispersion which can be emulsified in water. (Viscosity at 25° C.: 222 mPa.s, characteristic IR bands at 3.02 and 6.45 microns).

EXAMPLE 3

24.6 parts of methylene-bis-stearic acid amide are dissolved in 220 parts of molten beef tallow at 40° C. This solution is then added dropwise to a mixture, heated at 40–50° C., consisting of 220 parts of beef tallow, 80 parts of a reaction product of industrial lauryl alcohol with 3 mol of ethylene oxide, 24 parts of a reaction product of nonylphenol with 7 mol of ethylene oxide, and 16 parts of a reaction product of oleyl alcohol with 20 mol of ethylene oxide. The mixture is stirred for ½ hour and 590 parts of water are then added dropwise at 50° C. A white emulsion which can easily be dispersed in water is obtained. (Viscosity at 25° C.: 1,940 mPa.s).

EXAMPLE 4

180 parts of isobutyl stearate and 30 parts of methylene-bis-stearic acid amide are mixed at 130°–140° C. until a clear solution has formed. This is now slowly added dropwise to a mixture, kept at 20° C., consisting of 260 parts of isobutyl stearate, 85 parts of a reaction product of a synthetic $C_{12}$–$C_{14}$–alcohol with 3 mol of ethylene oxide, 30 parts of a reaction product of nonylphenol with 6 mol of ethylene oxide, 6 parts of a reaction product of nonylphenol with 10 mol of ethylene oxide and 15.4 parts of a reaction product of oleyl alcohol with 20 mol of ethylene oxide. When the addition has ended, the mixture is stirred for ½ hour, during which a dispersion which can readily be emulsified in water is formed. (Viscosity at 25° C.: 32.5 mPa.s; characteristic IR bands at 3.02 and 6.45 microns).

EXAMPLE 5

29 parts of methylene-bis-stearic acid amide are dissolved in 180 parts of rape oil at 130° C. This solution is then run into 260 parts of rape oil in the course of 3 hours such that the temperature is kept at 30°-35° C. 46 parts of a mixture of 38.6 parts of a reaction product of industrial lauryl alcohol with 3 mol of ethylene oxide and 7.4 parts of a reaction product of oleyl alcohol with 50 mol of ethylene oxide are then added to the resulting suspension. The mixture is subsequently stirred at 20°-30° C. for ½ hour. The resulting dispersion can easily be emulsified in water. (Viscosity at 25° C.: 216 mPa.s, characteristic IR bands at 3.02 and 6.45 microns).

EXAMPLE 6

12.3 parts of methylene-bis-stearic acid amide are dissolved in 120 parts of methyl laurate at 140° C. This solution is now run slowly into a solution, kept at 30° C., consisting of 100 parts of methyl laurate, 43 parts of a reaction product of industrial lauryl alcohol with 3 mol of ethylene oxide, 12 parts of a reaction product of nonylphenol with 7 mol of ethylene oxide and 8 parts of a reaction product of oleyl alcohol with 20 mol of ethylene oxide. The mixture is stirred for 30 minutes and 295 parts of water are then run in slowly at room temperature, while stirring. 590 parts of an aqueous emulsion are obtained. (Characteristic IR bands of the anhydrous dispersion at 3.02 and 6.45 microns).

EXAMPLE 7

10.5 parts of methylene-bis-stearic acid amide are dissolved in 200 parts of rape oil at 130° C. This solution is now run slowly into a mixture, kept at 30°-40° C., of 21 parts of a reaction product of 1 mol of indus lauryl alcohol with 3 mol of ethylene oxide and 202 parts of rape oil. The mixture is subsequently stirred for ½ hour, during which it is cooled to room temperature, to give a dispersion which can be emulsified in water (characteristic IR bands at 3.02 and 6.45 microns).

EXAMPLE 8

The foam suppressants were tested side by side and in comparison with products A and B in accordance with the above mentioned instructions. Amounts used:

x g/l of foam suppressant and 0.4 g/l of a reaction product of 1 mol of oleyl alcohol with 50 mol of ethylene oxide.

x stands for the minimum amount required to achieve adequate removal of foam at pH 7 in the temperature range between 25° C. and the boiling point.

| Prod- | Example | | | | | | | | |
|---|---|---|---|---|---|---|---|---|---|
| uct | 1 | 2 | 3 | 4 | 5 | 6 | 7 | A | B |
| x | 0.05 | 0.04 | 0.06 | 0.04 | 0.03 | 0.04 | 0.04 | 0.1 | 0.1 |

Product A is a product prepared according to Example 2; in which the rape oil has been replaced by a mineral oil (according to Example 1, EP 0,035,702).

Product B is a product prepared according to Example 7, in which the rape oil has been replaced by a mineral oil (according to Example 3, EP 0,035,702).

It can be seen from the table that, to achieve adequate antifoaming effects, more than twice the amount of the corresponding products based on mineral oil is required.

We claim:

1. A foam suppressant and dearating agent, said agent being free of silicone oil and mineral oil and said agent consisting essentially of (a) an ester of a fatty acid containing 12 to 22 carbon atoms with a monohydric alcohol containing 1 to 4 carbon atoms, a diester of said fatty acid with a diol of 2 to 6 carbon atoms or a synthetic or naturally occurring triester of said fatty acid with glycerol, having a boiling point of at least 150° C. and, based on (a), (b) 0.5–10% by weight of an amide of the formula

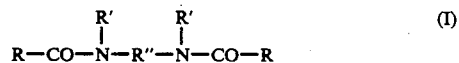

in which

R stands for $C_{10}$–$C_{22}$-alkyl or -alkenyl,

R' stands for H or $C_1$–$C_4$-allkyl, or the two R' together stand for an ethylene bridge, and R" stands for the radicals

or $CH_2$—O—$CH_2$—, wherein

R'" stands for H, $C_1$–$C_6$-alkyl or phenyl, and (c) 1–30% by weight of a non-ionic surfactant.

2. A foam suppressant and deaerating agent according to claim 1, wherein the ester (a) has a melting point of less than 50° C.

3. A foam suppressant and deaerating agent according to claim 1, wherein (b) is selected from the group consisting of methylene-bis-stearic acid amide, methylene-bis-eicosanoic acid amide and methylene-bis-behenic acid amide.

4. A foam suppressant and deaerating agent according to claim 1, wherein (b) is methylene-bis-stearic acid amide.

5. A foam suppressant and deaerating agent according to claim 1, wherein the non-ionic surfactant (c) is a reaction product of a $C_{12}$–$C_{198}$-fatty acid, a fatty acid amide, a $C_8$–$C_{18}$-fatty alcohol, a $C_6$–$C_9$-alkylphenol or mixtures thereof, with 3–30 mols of ethylene oxide, or an ester which is gformed by reaction of the terminal hydroxyl groups of any of the foregoing compounds with a $C_{12}$–$C_{18}$-fatty acid.

* * * * *

UNITED STATES PATENT AND TRADEMARK OFFICE
CERTIFICATE OF CORRECTION

PATENT NO. : 4,988,463

DATED : January 29, 1991

INVENTOR(S) : Walz et al.

It is certified that error appears in the above-identified patent and that said Letters Patent is hereby corrected as shown below:

Col. 6, claim 5 line 3  Delete " $C_{198}$ " and substitute -- $C_{18}$ --

Signed and Sealed this

Twenty-ninth Day of September, 1992

Attest:

DOUGLAS B. COMER

*Attesting Officer*         *Acting Commissioner of Patents and Trademarks*